United States Patent [19]
Thurmond, Jr.

[11] 3,879,027
[45] Apr. 22, 1975

[54] BICYCLE STAND

[76] Inventor: Meredith T. Thurmond, Jr., 872 W. 6th St., San Pedro, Calif. 90732

[22] Filed: Sept. 10, 1973

[21] Appl. No.: 395,879

[52] U.S. Cl. ............... 269/157; 211/22; 248/167
[51] Int. Cl. ............................................. A47f 7/00
[58] Field of Search ............................ 211/17–22, 211/167, 178 R; 248/167, 168; 269/203, 43, 157

[56] References Cited
UNITED STATES PATENTS

| | | | |
|---|---|---|---|
| 578,886 | 3/1897 | LeFevre | 211/22 |
| 594,627 | 11/1897 | Hewlett | 211/22 |
| 615,995 | 12/1898 | Leonard | 211/22 |
| 2,544,615 | 3/1951 | Raymond | 248/167 X |
| 3,212,770 | 10/1965 | Stephens | 269/227 X |

Primary Examiner—Roy Lake
Assistant Examiner—Neil Abrams
Attorney, Agent, or Firm—Gordon L. Peterson

[57] ABSTRACT

A bicycle stand comprising a hub, a plurality of legs mounted on the hub for pivotal movement, and a clamping member mounted on the hub. The clamping member includes first and second hooks which are adapted to engage and support the bicycle in a generally upright position above a supporting surface. The legs can be pivoted to a collapsed position to facilitate storage of the bicycle stand.

7 Claims, 9 Drawing Figures

3,879,027

BICYCLE STAND

BACKGROUND OF THE INVENTION

Bicycles require a considerable amount of maintenance and repairs, particularly if they are ridden often or treated roughly. Many a cycling enthusiast prefers to perform his own maintenance and repair services.

Because bicycles are not self-supporting, they are notoriously difficult to work on. Although the kick stand can be employed for support, the bicycle is still subject to tipping, particularly in the direction away from the kick stand. Moreover, the bicycle tends to roll in response to axial forces which may be applied thereto during repair or maintenance, and the wheels and drive mechanism cannot be freely rotated.

Presumably for reasons such as these, bicycle stands for supporting the bicycle above the floor or other supporting surface have been proposed. A bicycle stand provides a relatively stable support for the bicycle and allows the wheels and drive mechanism to be turned.

Bicycle stands are in large part used by the cyclist who wishes to perform his own maintenance and repair services. For a person such as this, adequate storage space is often difficult to find. Unfortunately, prior art bicycle stands require an extraordinary amount of storage space. In addition, prior art bicycle stands lack versatility and many other features which are desirable for bicycle repair and maintenance.

SUMMARY OF THE INVENTION

The present invention provides a bicycle stand, the overall dimensions of which can be greatly reduced for storage. The bicycle stand of this invention is also highly versatile and possesses a surprising combination of features.

In order for the bicycle stand to provide adequate stability, a base having broad overall dimensions is necessary unless the stand is to be complicated by means for permanently anchoring the stand to the floor. The bicycle stand of this invention provides a base which includes a hub and a sufficient number of legs of adequate length to firmly support the hub. To permit a reduction in overall dimensions of the base, the legs are mounted on the hub for pivotal movement. In an extended position of the legs, they provide firm support for the hub. The legs can be pivoted to a collapsed position in which the overall dimensions of the base are less than in the extended position of the legs.

Another feature of the invention is the simple and inexpensive manner in which the legs are mounted on the hub for pivotal movement. To accomplish this, the hub can advantageously include upper and lower plates and means for interconnecting the plates. The lower plate has a plurality of apertures, one for receiving each of the legs. The upper plate has a plurality of projections formed integrally therewith and projecting downwardly. One of the projections is provided for each of the legs with the projections and apertures being axially aligned. Each of the legs has a hollow upper end and may be constructed of hollow tubing. One of the legs is inserted into each of the apertures with the projections being received within the hollow upper end of the associated leg. Thus, the projections and the surfaces defining the apertures serve as bearings for mounting the legs for pivotal movement, such pivotal movement preferably occurring about a vertical axis.

The bicycle is supported by a clamping member which is mounted on, and above, the hub. The clamping member can advantageously, include a plurality of clamping elements telescoped together, first and second hooks mounted on first and second of such clamping elements, respectively, and releasable means for fixing the telescoped elements in any of a plurality of positions so that the spacing between the hooks can be varied. The hooks are adapted to engage first and second frame members of the bicycle to thereby support the bicycle above the supporting surface in a generally upright condition. Varying the spacing between the hooks adapts the bicycle stand to bicycles of different sizes and configurations.

When thus supported, the weight of the bicycle tends to pivot the first and second clamping members generally about portions of their respective axes. If conventional round or cylindrical tubing were employed, special precautions would have to be taken to assure that the bicycle would not be dropped as a result of axial rotational movement of the clamping elements. The present invention solves this problem by utilizing clamping elements, the telescoping portions of which are of non-circular cross-section. For example, by utilizing square tubes for the clamping elements, the tendency of the tubes to pivot relative to each other is resisted by the square cross-section. Thus, with the present invention, no separate anti-rotation mechanism is required.

To facilitate extending the clamping elements, a spring can be employed. Alternatively, manual drive means such as a rack and pinion drive can be employed to facilitate movement of the hooks toward or away from each other.

The front wheel of a bicycle is typically rotatably mounted on a fork which is, in turn, pivotable relative to the bicycle frame. One feature of this invention is based, in part, upon the realization that it is sometimes desirable during repair or maintenance to prevent pivotal movement of the fork while allowing rotation of the front wheel. To accomplish this, the present invention provides a fork-engaging member for engaging the fork to prevent pivotal movement thereof while not interfering with rotation of the wheel. Although various structure can be employed, the fork-engaging member preferably has a variable effective length to adapt it for bicycles of different sizes and configurations.

The clamping member can advantageously be supported above the hub by a post which is mounted on the hub and extends upwardly therefrom. More than one clamping member can be mounted on the post. Accordingly, the bicycle stand of this invention can simultaneously support more than one bicycle.

The clamping member, and hence the bicycle supported thereon, can advantageously be mounted for rotational movement about a vertical axis. This can be accomplished by mounting the post on the hub for pivotal movement relative to the hub. In addition, the bicycle can be supported at various working heights above the supporting surface by simply raising or lowering the post relative to the hub.

The invention can best be understood by reference to the following description taken in connection with the accompanying illustrative drawings.

DESCRIPTION OF THE PREFERRED EMBODIMENTS

Figure 1:
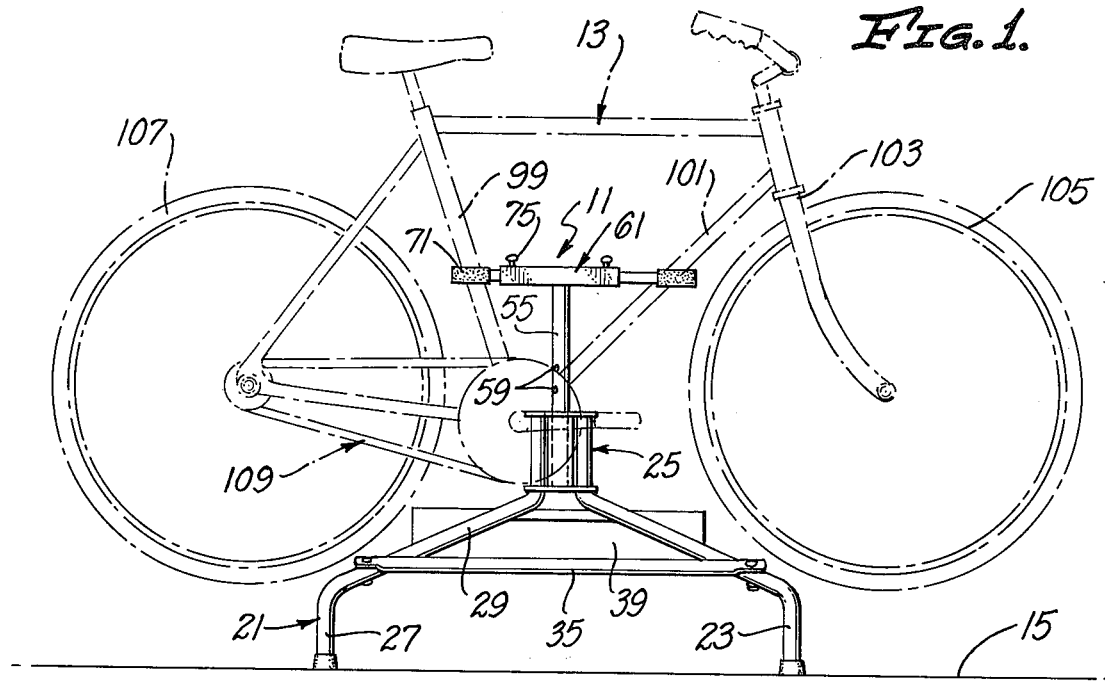
FIG. 1 is a side elevational view of a bicycle stand constructed in accordance with the teachings of this invention. A bicycle is shown in phantom lines as being supported by the bicycle stand.

FIG. 1 shows a bicycle stand 11 which is adapted for holding a bicycle 13 in a generally upright position above a supporting surface such as a floor 15. The bicycle stand 11 includes four legs 17, 19, 21 and 23, and a hub 25 forming a base for the bicycle stand. Although four legs have been illustrated, it should be understood that any number of legs suitable to support the bicycle 13 can be employed.

Figure 3:
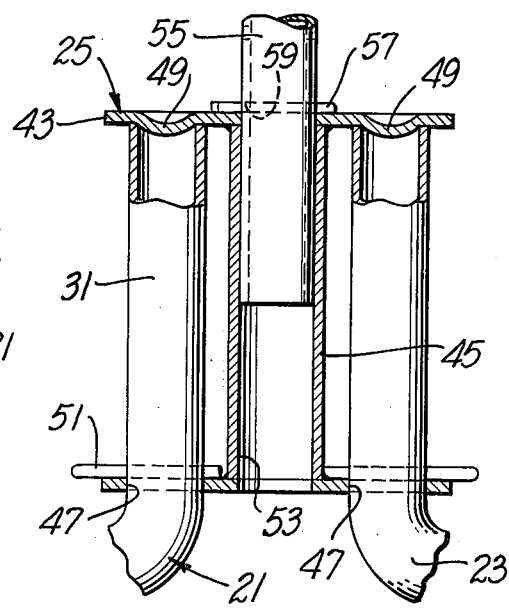
FIG. 3 is an enlarged, fragmentary, sectional view taken generally along line 3—3 of FIG. 2 and illustrating the mounting of the post and legs in the hub.

Each of the legs is identical, and accordingly, only the leg 21 is described in detail herein. Although the leg 21 could be constructed in a variety of ways, in the embodiment illustrated it is constructed from a single piece of hollow round tubing bent into an appropriate configuration. Specifically, the leg 21 has a lower vertical section 27, a sloping intermediate section 29, and an upper vertical section 31 (FIG. 3). Braces 33 and 35 extend between, and are fixed to, the pairs of legs 17, 19 and 21, 23, respectively. The leg 21 includes a plurality of apertures 37 along its length to permit attachment of the brace 35 at various positions on the leg 21. This permits the legs to assume various relative angular positions when the bicycle stand 11 is set up. In the embodiment illustrated, the legs 17, 19, 21 and 23 are spaced apart 90°.

If desired, a tool holding tray 39 may be releasably mounted on any adjacent pair of the legs such as the legs 17 and 19. The tray 39 may be constructed of plastic, and have releasable attachment means (not shown) for snapping the tray onto the legs 17 and 19.

The hub 25 can be of various different constructions provided that it mounts each of the legs 17, 19, 21 and 23 for pivotal movement. The construction illustrated in FIG. 3 is preferred because of its simplicity and low cost. Specifically, the hub 25 includes a lower plate 41, an upper plate 43, and means in the form of a tube 45 for interconnecting the two plates. The tube 45 can be attached to the plates 41 and 43 in any suitable manner and each of these three parts may be constructed of any suitable material such as metal. The plates 41 and 43, in the embodiment illustrated, are parallel and horizontal.

The lower plate 41 has a plurality of apertures 47, one being provided for each of the legs 17, 19, 21 and 23. In the embodiment illustrated, four of the apertures 47 are provided with the apertures being equally spaced circumferentially. A plurality of projections in the form of dimples 49 are formed integrally with the material of the upper plate 43. One of the dimples 49 is provided for each of the apertures 47, and accordingly, four of the dimples are provided in the illustrated embodiment of the invention. The dimples 49 are in axial alignment with the apertures 47, respectively. The dimples 49 project downwardly from the plane of the upper plate 43 and may be formed, for example, by a drawing process.

The upper section 31 of the leg 21 is inserted through one of the apertures 47. The upper end of the leg 21 is open and is sized to receive one of the dimples 49. The surface defining the aperture 47 through which the leg 21 projects and the associated dimple 49 serve as bearings to mount the leg 21 for pivotal movement relative to the hub 25 about a vertical axis. A pin 51 inserted completely through the leg 21 bears against the upper surface of the plate 41 to prevent withdrawal of the leg 21 from the associated aperture 47 and dimple 49. The other legs 17, 19 and 23 are mounted in an identical manner.

The tube 45 has a cylindrical passage 53 extending therethrough which is in registry with centrally located, circular openings in the plates 41 and 43. In addition to interconnecting the plates 41 and 43, the tube 45 serves as means for mounting a post 55 for rotational movement about a vertical axis. The post 55 in the embodiment illustrated is in the form of a metal tube of circular cross-section sized to be slidably received in the passage 53. A pin 57 is inserted in any one of a plurality of axially spaced radial openings 59 in the post 55. The pin 57 bears on the upper surface of the plate 43 to locate the post 55 axially with respect to the tube 45. The height which the tube 55 projects above the hub 25 can be changed by inserting the pin 57 into other of the apertures 59.

Figure 2:
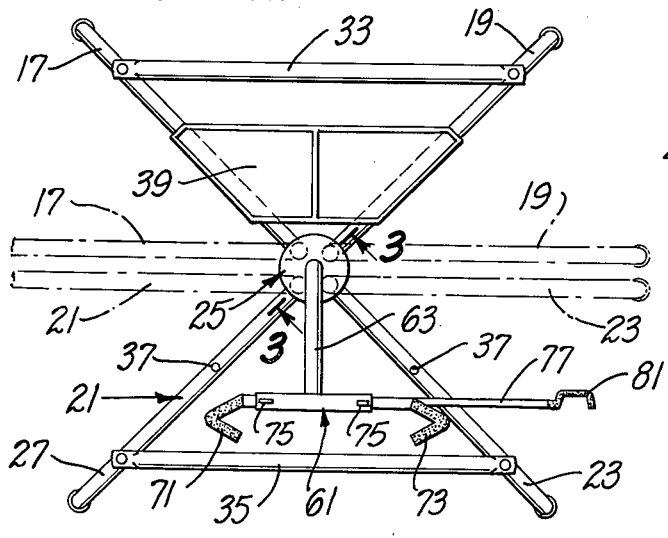
FIG. 2 is a top plan view of the bicycle stand.

As shown in FIG. 2, a clamping member 61 is affixed to the post 55 by a radially extending arm 63. Although various different constructions can be employed, in the embodiment illustrated the arm 63 is integral with and forms a portion of the post 55.

Figure 4:
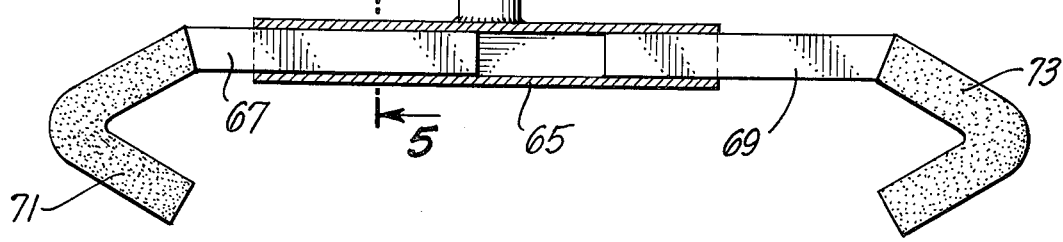
FIG. 4 is an enlarged fragmentary plan view partially in section showing one form of clamping member.
Figure 5:
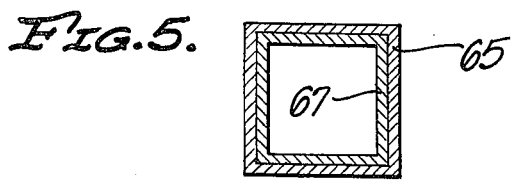
FIG. 5 is a sectional view taken generally along line 5—5 of FIG. 4.

As shown in FIGS. 4 and 5, the clamping member 61 includes a plurality of clamping elements in the form of a central tube 65 and end tubes 67 and 69 telescopically received within the central tube. The tube 65 is appropriately affixed as by welding to the arm 63 and is perpendicular to the arm. Each of the end tubes 67 and 69 is formed from a piece of hollow tubing. The end tubes 67 and 69 terminate in hooks 71 and 73, respectively, which open toward each other. In the embodiment illustrated, each of the hooks 71 and 73 is generally V-shaped in plan; however, any configuration suitable for supporting the bicycle in the manner described herein can constitute a "hook" as that term is used herein. The hooks 71 and 73 are provided with a nonmetallic coating of plastic or rubber material so that they will not scratch or damage the portions of the bicycle frame which come in contact with them.

The spacing between the hooks 71 and 73 can be adjusted by sliding the tubes 67 and 69 within the central tube 65. When an appropriate spacing is reached, screws 75 (FIGS. 1 and 2) are tightened to fix the axial position of the hooks.

As shown in FIG. 1 and as described more fully hereinbelow, the hooks 71 and 73 support the bicycle 13.

The weight of the bicycle produces a torque on the end tubes 67 and 69 tending to pivot them about the central longitudinal axis of the central tube 65. To prevent such turning movement, each of the tubes 65, 67 and 69 is of noncircular cross-section. As shown in FIG. 5, the tubes 65 and 67 are of square cross-sectional configuration, and the tube 69 can be similarly constructed.

Figure 6:
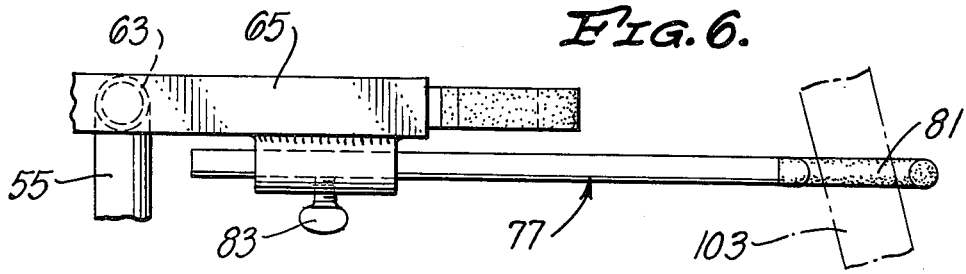
FIG. 6 is a fragmentary elevational view of a portion of the clamping member and the fork-engaging member.

A fork-engaging member 77 (FIGS. 2 and 6) is mounted on the underside of the tube 79 which is suitably affixed to the tube 65 as by welding. The fork-engaging member terminates outwardly in a fork-engaging portion in the form of a hook 81. The position of the hook 81 can be adjusted by sliding the fork-engaging member in the sleeve 79. When an appropriate position for the hook 81 is reached, a screw 83 is tightened to thereby fix the fork-engaging member 77 in position.

Figure 7:
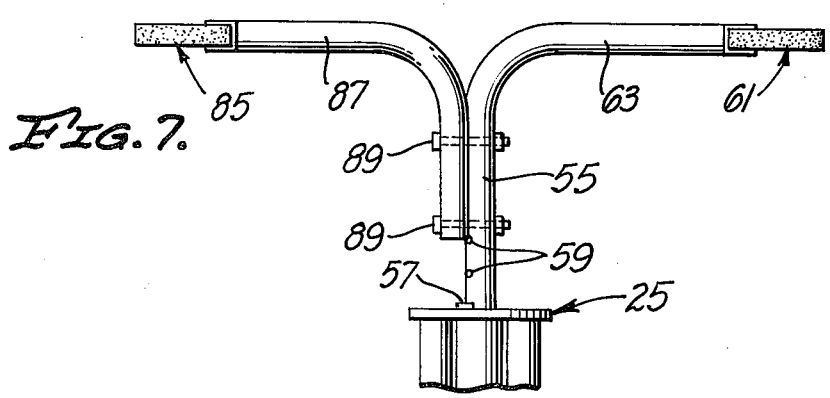
FIG. 7 is a fragmentary side elevational view illustrating how two clamping members can be mounted on the post.

FIG. 7 illustrates how the bicycle stand 11 can be adapted to hold two bicycles. To accomplish this, a second clamping member 85 is mounted on the post 55 by an arm 87 and a plurality of releasable, threaded fasteners 89. The clamping member 85 may be identical to the clamping member 61.

Figure 8:
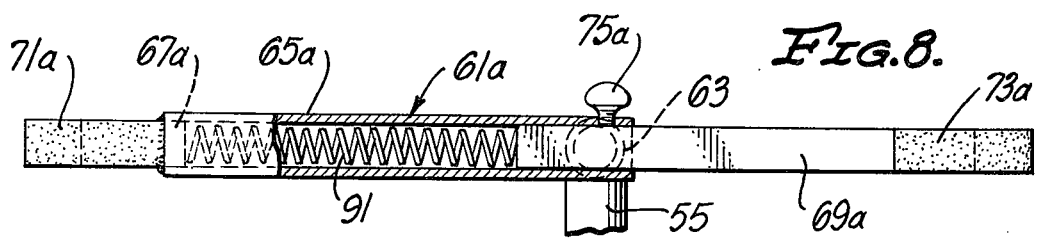
FIG. 8 is an elevational view partially in section of a second form of clamping member.

FIG. 8 illustrates a clamping member 61a representing a modification of the clamping member 61. Portions of the clamping member 61a corresponding to portions of the clamping member 61 are designated by corresponding reference numerals followed by the letter "a." The clamping member 61a is identical to the clamping member 61 in all respects not specifically shown or described herein.

The clamping member 61a includes a tube 65a one end of which is affixed to the arm 63. The end tube 67a is much shorter than the end tube 67. The end tube 67a is telescoped within the central tube 65a and is fixedly attached to the central tube in any suitable manner such as by welding. The tube 69a is telescopically received within the tube 65a and may be somewhat longer than the tube 69. Because only the tube 69a is movable, only one of the screws 75a is provided.

The primary difference between the clamping member 61a and the clamping member 61 is that the former has a coil compression spring 91 located within the tube 65a and acting between the end tubes 67a and 69a. The spring 91 urges the tube 69a axially outwardly of the central tube 65a so that lengthening of the distance between the hooks 71a and 73a is facilitated.

Figure 9:
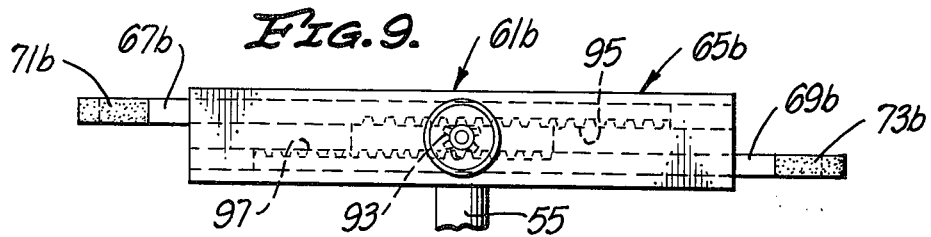
FIG. 9 is a fragmentary elevational view of a third form of clamping member.

FIG. 9 shows a clamping member 61b which is identical to the clamping member 61 (FIG. 4) in all respects not shown or described herein. Portions of the clamping member 61b corresponding to portions of the clamping member 61 are designated by corresponding reference numerals followed by the letter "b."

The clamping member 61b includes a central tube 65b containing appropriate inserts or grooves for slidably telescopically mounting and receiving end tubes 67b and 69b. A pinion 93 is rotatably mounted on the central tube 65b for rotation by an external control knob (not shown). Portions of the inner ends of the end tube 67b and 69b form racks 95 and 97, respectively, which mesh with the pinion 93. Accordingly, by rotating the pin 93, the racks 95 and 97 can be driven inwardly or outwardly to thereby adjust the spacing between the hooks 71b and 73b. At least the portions of the tubes 71b and 73b which form the racks 95 and 97 may be constructed of solid bars in lieu of hollow tubing, if desired.

The bicycle stand 11 can be utilized with bicycles of various sizes and configurations. For example, the bicycle 13 (FIG. 1) includes a frame having diagonal frame member 99 and 101, a fork 103 mounted for pivotal motion relative to the frame, and a front wheel 105 rotatably mounted on the fork. The bicycle 13 also includes a rear wheel 107 rotatably mounted on the frame and the usual chain drive 109 for driving the rear wheel.

Assuming that the bicycle stand 11 is in the position shown in FIG. 1, it can be utilized by simply manually positioning the bicycle with the frame members 99 and 101 being received by the hooks 71 and 73, respectively. The end tubes 67 and 69 can be slid relative to the central tube 65 to facilitate mounting of the bicycle thereon, if necessary. When thus supported, the bicycle 13 is in generally a vertical or upright condition, and the wheels 105 and 107 are above the supporting surface 15 so that they can be independently rotated. The square cross-sections of the tubes 65, 67 and 69 prevent relative pivotal movement of these tubes.

The screw 83 is then loosened and the fork-engaging member 77 is axially and angularly adjusted so that the hook 81 thereof engages one of the bars of the fork 103. Specifically the member 77 may be rotated in the sleeve 79 so that the hook 81 opens upwardly when the bicycle 13 is mounted on the stand 11. This prevents the hook from interfering with mounting of the bicycle. Thereafter the member 77 may be extended or retracted as necessary to place the hook 81 immediately adjacent the fork 103. The member is then rotated so that the hook 81 embraces a portion of the fork 103 and the screw 83 is tightened. The fork-engaging member 77 does not engage or interfere with rotation of the front wheel 105. Rather, the hook 81 engages the fork 103 to prevent pivotal movement of the fork relative to the bicycle frame while allowing rotation of the front wheel 105.

As the tube 55 is rotatable in the sleeve 45, the bicycle 13 can be rotated while it is supported by the stand 11. The height at which the bicycle 13 is supported above the supporting surface 15 can be adjusted by the pin 57 and the openings 59 in the post 55 and/or by varying the spacing between the hooks 71 and 73. The clamping member 85 can be used simultaneously with the clamping member 61 support a second bicycle, if desired.

When the bicycle stand 11 is not in use, the braces 33 and 35 can be removed and each adjacent pair of legs 17, 19, 21 and 23 can be pivoted relative to the hub 25 into closely adjacent relationship. This is illustrated by way of example in dashed lines in FIG. 2. This greatly facilitates storage of the bicycle stand 11 in that the broad dimensions of the base are greatly reduced. Of course, the tray 39 must be removed from the legs 17 and 19 before these legs can be pivoted. Further dimensional reduction of the bicycle stand for storage purposes can be obtained by lowering the post 55 and by moving the hooks 71 and 73 closer together.

Although exemplary embodiments of the invention have been shown and described, many changes, modifications, and substitutions may be made by one having ordinary skill in the art without necessarily departing from the spirit and scope of this invention.

I claim:

1. A bicycle stand for supporting a bicycle having first and second frame members, said bicycle stand comprising:
   a hub;
   a plurality of legs, said legs being adapted to engage the supporting surface and to support said hub;
   means for mounting said legs on said hub for pivotal movement relative thereto, said legs being pivotable between an extended position in which the legs provide firm support for said hub and a collapsed position in which the overall dimensions of said bicycle stand are less than in said extended position of said legs;
   a clamping member including first and second spaced hooks;
   means for mounting said clamping member on said hub;
   said first and second hooks being adapted to engage the first and second frame members, respectively, and to support the bicycle in a generally upright position; and
   said hub including an upper plate and a lower plate and means for interconnecting said plates, said lower plate having an aperture therein for receiving a first of said legs, said upper plate having an integral projection thereon which projects downwardly from the upper plate, said first leg having an open upper end for at least partially receiving said projection whereby said first leg is pivotally mounted by said aperture and said projection.

2. A bicycle stand for supporting a bicycle having first and second frame members, said bicycle stand comprising:
   a hub;
   a plurality of legs, said legs being adapted to engage the supporting surface and to support said hub;
   means for mounting said legs on said hub for pivotal movement relative thereto, said legs being pivotable between an extended position in which the legs provide firm support for said hub and a collapsed position in which the overall dimensions of said bicycle stand are less than in said extended position of said legs;
   a clamping member including first and second spaced hooks;
   means for mounting said clamping member on said hub; said first and second hooks being adapted to engage the first and second frame members, respectively, and to support the bicycle in a generally upright position; and
   each of said legs being pivotable about an axis which extends generally vertically when said legs are in said extended position and resting on the supporting surface, said clamping member being above said hub and adapted to support the bicycle above the supporting surface, said hub including an upper plate and a lower plate and means for interconnecting said plates, said lower plate having an aperture therein for receiving a first of said legs, said upper plate having an integral dimple therein which projects downwardly, said first leg having an open upper end for at least partially receiving said dimple whereby said first leg is pivotally mounted by said aperture and said dimple, said clamping member includes a plurality of clamping elements telescoped together with said first and second hooks being mounted on first and second of said clamping elements and releasable means for fixing said telescoped clamping elements in any of a plurality of positions whereby the spacing between said hooks can be varied to thereby permit the bicycle stand to support bicycles of different sizes and configurations, the weight of the bicycle when supported by said hooks tending to pivot said first and second clamping elements generally about at least portions of their respective axes, at least portions of said clamping elements being of noncircular cross-sectional configuration whereby the cross sections of the clamping elements inherently resist the tendency of said first and second clamping elements to pivot under the influence of the weight of the bicycle.

3. A bicycle stand as defined in claim 1 wherein said clamping member includes a plurality of clamping elements telescoped together with said first and second hooks being mounted on first and second of said clamping elements and releasable means for fixing said telescoped clamping elements in any of a plurality of positions whereby the spacing between said hooks can be varied to thereby permit the bicycle stand to support bicycles of different sizes and configurations, the weight of the bicycle when supported by said hooks tending to pivot said first and second clamping elements generally about at least portions of their respective axis, at least portions of said clamping elements being of noncircular cross-sectional configuration whereby the cross-sections of the clamping elements inherently resist the tendency of said first and second clamping elements to pivot under the influence of the weight of the bicycle.

4. A bicycle stand as defined in claim 1 wherein the bicycle has a front wheel rotatably mounted on a pivotable fork and said stand supports the bicycle with the front wheel above the supporting surface, said stand including fork-engaging means engageable with the fork when the bicycle is supported by said clamping member to prevent pivoting of said fork while allowing rotation of the front wheel.

5. A bicycle stand as defined in claim 1 wherein said means for mounting said clamping member on said hub includes a post mounted on said hub and projecting upwardly therefrom, said clamping member being a first clamping member and being mounted on said post for supporting the bicycle on one side of the post, said stand including a second clamping member mounted on said post for supporting another bicycle on the opposite side of said post.

6. A bicycle stand as defined in claim 1 wherein each of said legs is pivotable about an axis which extends generally vertically when said legs are in said extended position and resting on the supporting surface, said clamping member being above said hub and adapted to support the bicycle above the supporting surface.

7. A bicycle stand as defined in claim 1 wherein the bicycle includes a pivotable fork with the front wheel rotatably mounted thereon and the bicycle stand includes fork-engaging means engageable with the fork when the bicycle is supported by said stand to prevent pivoting of said fork while allowing rotation of the front wheel.

* * * * *